May 4, 1965 W. R. AIKEN 3,182,271

TONE CONTROL CIRCUIT FOR EMPHASIZING LOW VOLUME HIGH AND LOW FREQUENCY SIGNALS

Filed Dec. 15, 1960 3 Sheets-Sheet 1

INVENTOR.
WILLIAM ROSS AIKEN

BY [signature]

INVENTOR.
WILLIAM ROSS AIKEN

BY K. H. Hauchen

May 4, 1965 W. R. AIKEN 3,182,271
TONE CONTROL CIRCUIT FOR EMPHASIZING LOW VOLUME HIGH AND LOW FREQUENCY SIGNALS
Filed Dec. 15, 1960 3 Sheets-Sheet 3

INVENTOR.
WILLIAM ROSS AIKEN
BY 3,182,271

TONE CONTROL CIRCUIT FOR EMPHASIZING LOW VOLUME HIGH AND LOW FREQUENCY SIGNALS

William Ross Aiken, 10410 Magdalena Ave., Los Altos Hills, Calif.

Filed Dec. 15, 1960, Ser. No. 76,016

2 Claims. (Cl. 333—18)

The present invention relates to arrangements for changing the relative strength of parts of the audio frequency range to produce a signal that is pleasing to the listener. The present invention proceeds from the fact that the human ear is less perceptive of the low and high frequencies of the audio range at low volume levels than at medium and high volume levels, as demonstrated by the Fletcher-Munson Contours of Equal Loudness. Hence, a musical composition that is originally produced at a high volume level in a large room, such as a music hall, sounds poorly when reproduced at a substantially lower volume level in a private home, because at the lower volume level the human ear may scarcely hear the high and especially the low frequencies of the audio range while the middle register frequencies are still clearly audible. Hence, there is incorrect tonal balance as far as the ear of the listener is concerned, and in fact part of the sound of the original performance may be entirely lost to him.

Object of the invention is to provide a tone control arrangement that compensates automatically for variations in the ability of the human ear to perceive the various frequencies of the audio range uniformly at different volume levels.

Formerly, in apparatus adjusted to perform at low volume levels, it was necessary to set the manually adjustable bass and treble control means for extra gain, with the result that whenever the volume level of a composition rose, or the general volume level of a reproduction was intentionally raised, the amplification of the low and high frequency sounds thereof became excessive and resulted in excessively booming bass notes, shrill treble notes and excessive emphasis of distortions introduced in the recording of the original composition.

It is another object of the invention to provide an automatic tone control arrangement, of the type referred to, that attenuates excessive strength of the low and high frequencies of an audio signal at high volume levels.

It is yet another object of my invention to provide an automatic tone control arrangement that does not only vary the relative strength of portions of the audio range for different volume levels to compensate for non-uniformities in the perception of the human ear for different frequencies of the audio range at different volume levels, but which will also operate to raise and lower the general volume level of the loud and soft passages, respectively, of a reproduction to re-establish the dynamic volume range of the initial performance and thus provide a quality of reproduction that is practically identical with and as pleasing to the human ear as the initial performance itself.

These and other objects of the present invention will be apparent from the following description of the accompanying drawings which illustrate certain preferred embodiments thereof and wherein FIGURE 1 is a block diagram which illustrates the principles of the invention;

Basically, the tone control arrangement of my invention is formed by a variable filter and a variable volume changer connected in series, and means for controlling the filter characteristics of the variable filter and the performance of the variable volume changer in a manner dependent upon the volume of the signal passing through the tone control arrangement by means of a voltage derived from the signal at the input side of the arrangement or from a point beyond the variable filter, such as at the output end of the tone control arrangement. Alternatively, the characteristics of the filter and the performance of the volume changer may be controlled by a variable voltage that is derived from an independent source, such as a separately received signal.

By variable filter I means a frequency selective circuit in which the degree to which certain portions of a predetermined frequency range are suppressed relative to other portions may be varied, and by variable volume changer I mean a variable gain circuit that operates at gain levels of less than unity and/or more than unity; in other words, the term is understood to include not only variable gain amplifiers in the common meaning of the word, but also variable attenuators.

Figure 1:
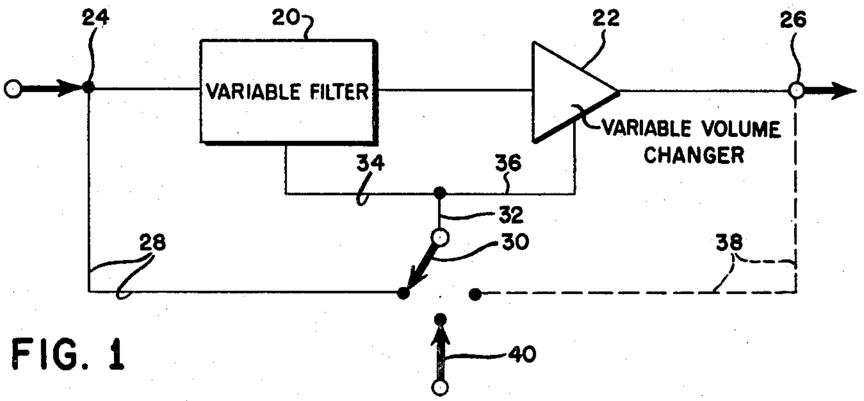

Having now reference to FIGURE 1, a variable filter represented by the block 20 and a variable volume changer represented by the triangle 22 are connected in series between the input means 24 and the output means 26 of the tone control arrangement, and the performance of the filter and the performance of the volume changer are both controlled by a voltage that is derived from the signal supplied to the arrangement at the input end thereof as schematically indicated by the line 28, the switch arm 30 and the lines 32, 34 and 36. Alternatively, the filter and the volume changer may be controlled by a voltage derived from the signal at the output end thereof as schematically indicated by the broken line 38 which may be connected to the filter and the volume changer by appropriate setting of the switch arm 30. As a third alternative, the performance of the filter and the performance of the volume changer may be controlled from an independent source schematically indicated by the arrow 40 to which the switch arm 30 may be set.

Figure 2:
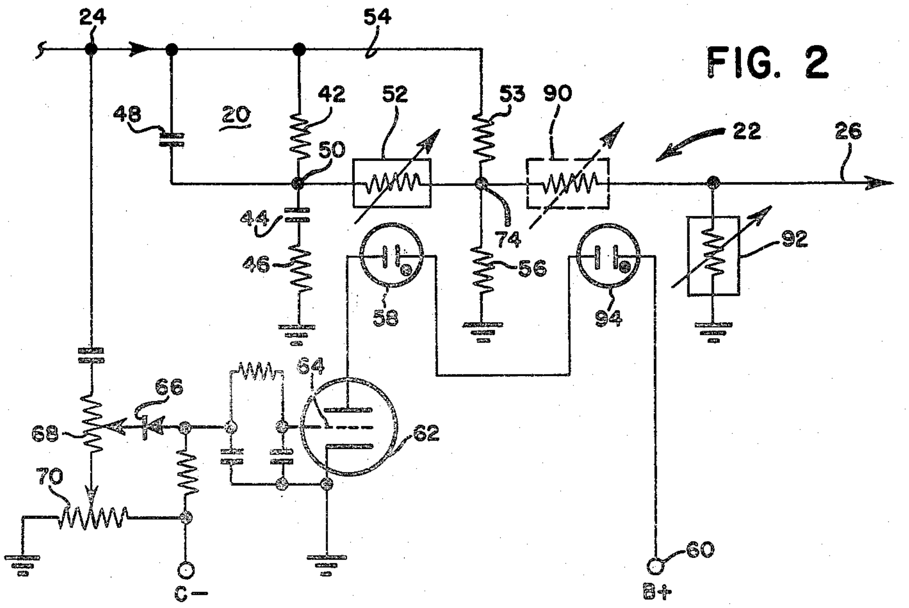
FIGURE 2 is a circuit diagram illustrating a practical embodiment of the invention.

FIGURE 2 illustrates diagrammatically a practical embodiment of the invention as represented by the block diagram of FIGURE 1. The variable filter 20 is formed by a voltage divider network comprising a resistor 42, a condenser 44 and another resistor 46 in series connected between the input line 24 and ground, with the first resistor shunted by a condenser 48 that is usually of lesser capacitance than the series-connected condenser 44. The values of resistor 42 and shunt condenser 48 are so chosen that the reactance of the condenser equals the resistance of the resistor at a selected medium frequency, and at said frequency the level of the output voltage derived at point 50 is approximately proportional to one half of the resistance of said resistor 42 or the reactance of said condenser 48 relative to the reactance presented by condenser 44 and resistor 46 in series. At higher or lower frequencies, however, the voltage developed at point 50 is higher than the voltage developed at the selected medium frequency assuming the volume strength of all compared input signals to be equal. At higher frequencies most of the incoming signal by-passes the resistor 42 through condenser 48 because as the frequency of a signal increases, the capacitive reactance presented by the small condenser 48 decreases. As a result the reactance presented to the incoming signal by condenser 48 becomes small as compared to the reactance presented to the signal by the larger condenser 44 in series with the resistor 46. Hence, for signals of higher frequency the voltage developed at point 50 of the divider network will be larger. Similarly, the voltage developed at point 50 of the voltage divider network will be larger for lower frequencies than the selected medium frequency because at lower frequencies the reactance presented to the signal by the condenser 48 becomes increasingly larger so that passage of the signal through condenser 48 is effectively blocked and the resistance presented to the signal above point 50 is almost exclusively determined by the resistor 42 whose value remains constant. At the same time, however, the impedance presented to the signal below point 50 becomes progressively larger because the reactance of condenser 44 increases with decreasing frequency. Thus, the impedance below point 50 increases while the resistance of resistor 42 above point 50 remains substantially the same. Hence, at point 50 appears an increasingly larger portion of the voltage developed across resistor 42, condenser 44, and resistor 46 to ground.

In accordance with my invention I control the extent to which the described frequency-sensitive filter may partake in the formation of an output signal by a variable resistor in combination with a shunt-line around said filter. Said control resistor may be located in the output line of the filter in which case the shunt line contains a blocking resistor of predetermined value that is smaller than the maximum value of the variable control resistor. In such an arrangement the output of the total network will reflect the frequency-sensitive performance of the filter as long as the value of the variable control resistor in the output line thereof remains below the value of the blocking resistor in the shunt line. However by setting said variable resistor to a value above the value of the blocking resistor the signal passes primarily through the by-pass line, and the frequency-sensitive response of the variable filter is thus effectively eliminated from the output signal. Alternatively, the variable resistor may be located in the shunt line in which event the output of the network will be highly frequency-sensitive when the control resistor is set to its maximum value, and show only a slight, or no frequency sensitivity at all when the control resistor is set to its minimum value.

In the exemplary embodiment of the invention illustrated in FIGURE 2, I place a variable resistor 52 into the output line 50 of the filter 20 and a suitable blocking resistor 53 into a by-pass line 54, and I arrange matters in such a manner that the variable resistor 52 has a low value when the volume of a signal supplied to the network is low so that the frequency-sensitive performance of the variable filter 20 comes fully into effect in the output signal of the network, but as the volume of the incoming signal increases, the value of the variable control resistor increases and forces an increasingly greater part of the signal to travel along the by-pass line 54 including resistor 53, so that the frequency-sensitive effect of the filter 20 is progressively eliminated from the output signal. The performance of the described arrangement is such that the output volume level of the bass and treble frequencies is varied while the output volume level of the middle frequencies remains the same.

The variable resistor represented by the block 52 may be a solid state photo-cell, such as the photo-cell sold under the name Clairex PC–603 and located adjacent said photo-cell in operative relation thereto is a neon light 58 that is energized by a battery 60. Said neon light shines brightly as long as the signal supplied to the filter network is of low volume, but dims progressively as the volume of the signal increases. For this purpose the neon lamp 58 lies in the anode circuit of a triode 62, and applied to the control grid 64 of said triode is a rectified voltage derived from the signal supplied to the input end of the filter as illustrated in FIGURE 2 wherein 66 indicates a rectifier, 68 a tapped resistor whose adjustment determines the degree of change in the illumination of the neon light with changes in the volume strength of the incoming signal, and 70 a tapped resistor by means of which it is possible to set a desired threshold for the signal at which the illumination of the neon light commences to change.

Figure 3:
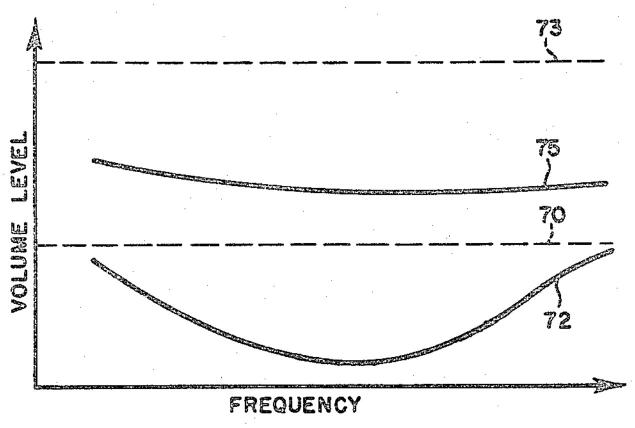
FIGURE 3 is a diagram illustrating the performance of a variable filter that forms part of the arrangement shown in FIGURE 2, at different volume levels of the incoming signal.

When the incoming signal is low in volume, the bias applied to the control grid 64 of triode 62 is small, and maximum current flows in the anode circuit of the triode causing the neon light 58 to shine brightly. As a result, the value of the variable control resistor 52 is low, and any signal applied to the input point 24 will therefore pass primarily through the filter 20. For low volume signals, such as indicated by the broken line 70 in FIGURE 3, the volume of the output voltage is therefore highly frequency-dependent, and is low at the middle frequencies of a selected range and relatively high at the low and high frequency ends of the range as indicated by the curve 72 drawn in a full line in said FIGURE 3. At high volume levels of the incoming signals, however, such as indicated by the broken line 73 in FIGURE 3, a strong negative bias is applied to the control grid 64 of the triode 62, causing the anode current thereof to decrease. As a result thereof the neon light 58 dims and may eventually become extinguished causing the resistance of the photo-cell 52 to increase in relation to the value of the resistor 53 in the by-pass line 54 until the filter network 20 is effectively by-passed by the signal and the size of the output voltage of the system at point 74 is determined solely by the ratio of resistor 53 above point 74 to resistor 56 below said point and is practically frequency-independent as illustrated by the solid line 75 in FIGURE 3.

Figure 4:
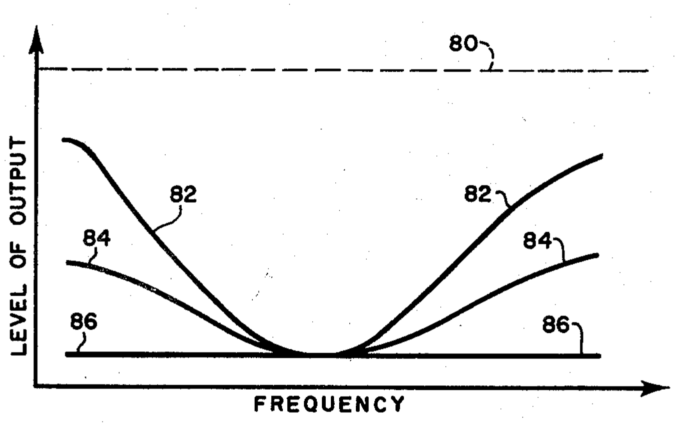
FIGURE 4 is a diagram illustrating the performance of the varibale filter at a constant volume level for different settings of the filter.

It may here be in order to mention that the adjustable frequency-sensitive filter system of my invention is of considerable utility outside of the particular tone control arrangement which I am about to describe. It provides means for adjusting the frequency sensitivity of a filter irrespective of any changes in the volume of the incoming signal as illustrated in FIGURE 4 wherein the volume of the signals supplied to the described filter network is assumed to be constant and is represented by the broken horizontal line 80. By varying the value of control resistor 52, manually or otherwise, from a minimum value of, say, 10 kiloohms to a maximum value of, say, 3 megohms, the output of the filter network illustrated in FIGURE 2 at point 74 may be varied from the highly frequency-sensitive characteristic represented by the solid curve 82 through performance characteristics of progressively lesser frequency sensitivity represented by the intermediate curve 84 which is of shallower conformation, to the frequency-independent response characteristic represented by the solid horizontal line 86.

Figure 5:
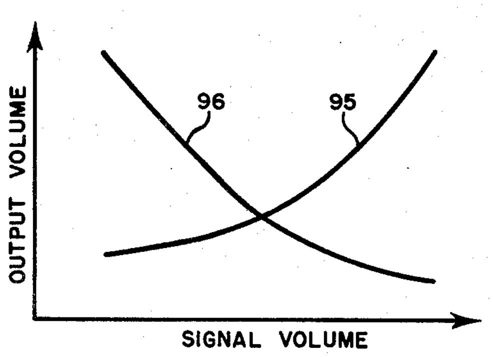
FIGURE 5 is a diagram illustrating the performance of a variable attenuator such as may form part of the arrangement represented by FIGURES 1 and 2.

Reverting to the tone control arrangement represented by the block diagram of FIGURE 1 and illustrated in greater detail by the circuit diagram of FIGURE 2, the signal passed by the filter network 20 is supplied to the variable attenuator 22 which comprises a series resistor 90 and a resistor 92 connected between the output line and ground. If the tone control arrangement of the invention is to operate as an expander, the resistor 92 may be made to vary from a low value at low signal volume levels to a high value at high signal volume levels. For this purpose, it is merely necessary to use another solid state photocell as resistor 92 and expose it to illumination by the same neon light that controls the resistance value of variable resistor 52, or to connect another neon light 94 into the anode circuit of the triode 62 and locate it in proper relation to the photo-cell 92, as diagrammatically illustrated in FIGURE 2. In such an arrangement the output of the attenuator 22 increases as the volume of the input signal increases as illustrated by the curve 95 in FIGURE 5. If the tone control arrangement is to operate as a compressor, however, the series resistance 90 may be made to vary from a low value at low volume levels to a high value at high volume levels so that the output of the attenuator 22 decreases with increasing volume levels as illustrated in FIGURE 5 by the curve 96. This may easily be accomplished by using a solid state photo-cell in place of the fixed resistor 90 as indicated in phantom lines in FIGURE 2, and exposing said photo-cell to illumination by the light of the neon tube 94, and by replacing the photo-cell 92 with a fixed resistance.

Figure 6:
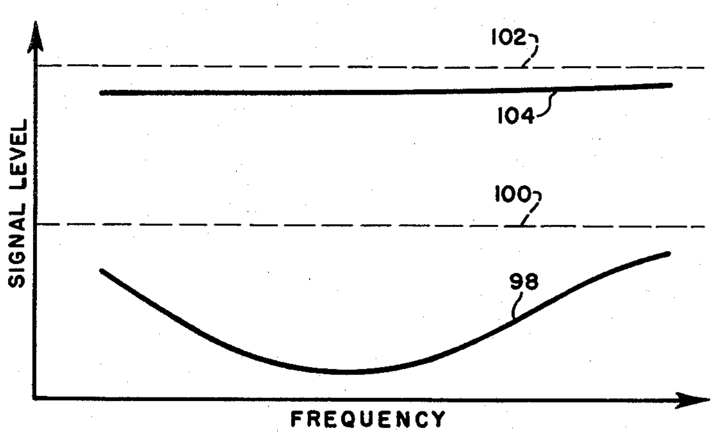
FIGURE 6 is a diagram illustrating the over-all performance of the tone control arrangement represented by FIGURES 1 and 2.

When the tone control arrangement of the invention is constructed as an expander, such as the system illustrated in FIGURE 2, it has an output characteristic at low volume levels that is highly frequency-sensitive and substantially attenuated as compared with the volume level of the input signal, as illustrated by a comparison of the solid line curve 98 with the straight broken line 100 in FIGURE 6. At high volume levels such as illustrated by the broken horizontal line 102 in said FIGURE 6, it has a frequency-independent output characteristic that is only slightly attenuated as compared with the volume level of the input signal, as illustrated by the solid straight line 104.

Thus, the tone control arrangement of my invention provides substantial attenuation of the middle frequencies of the audio range at low volume levels of the input signal and relatively increased treble and bass frequencies, but at high volume levels of the input signal, it provides a substantially uniform response with a minimum of attenuation. Hence, it will not only provide high fidelty of reproduction of a musical rendition at high volume levels, it will also provide at low volume levels the type of tonal reproduction that is pleasing to the listener in spite of the inability of the human ear at low volume levels to perceive bass and treble notes with equal distinctiveness as the middle frequencies of the audio range.

Figure 7:
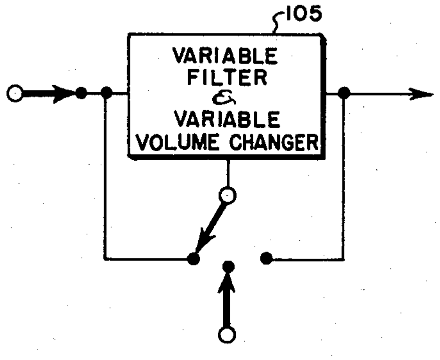
FIGURE 7 is a block diagram of a simplified embodiment of the invention.
Figure 8:
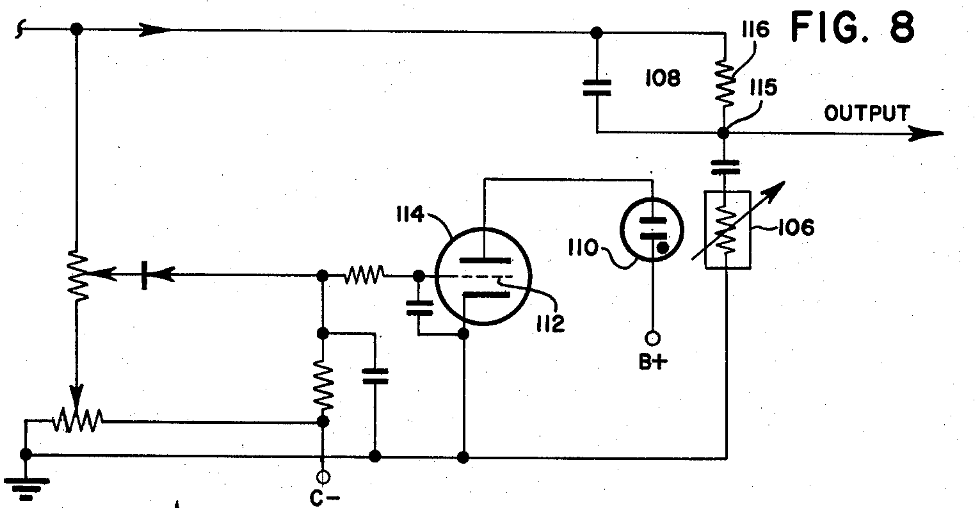
FIGURE 8 is a circuit diagram of the embodiment of the invention represented by FIGURE 7.

FIGURE 7 illustrates a preferred embodiment of the invention wherein the variable filter and the variable attenuator of which the control arrangement illustrated in FIGURES 1 and 2 is comprised, are combined in a single unit 105 and require no more components than comprised in the filter system by itself, as more clearly apparent from FIGURE 8. Said embodiment differs from the system illustrated in FIGURES 1 and 2 by the fact that the ground resistor 46 of the former is made variable as indicated at 106 in FIGURE 8 and effectively takes the part of both the variable output resistor 52 of the filter 20 and the variable resistor 92 of the attenuator 22 in the former arrangement. In other words, in the arrangement illustrated in FIGURE 8 the variable resistor 106 while forming an integral part of the frequency-selective filter 108 so that any variations in its value modify the performance of said filter, is so located within said filter that variations in its value affect simultaneously the amplitude of the filter output. Thus, the arrangement illustrated in FIGURE 8 performs in substantially the same manner as the more complex arrangement illustrated in FIGURE 2, at a saving of several components in that it uses but one variable resistor 106 and one neon light 110 where the former system required two such variable resistors 52 and 92, two neon lights 58 and 94 and four additional resistors, namely the resistors 46, 53, 56 and

90 shown in FIGURE 2 which have no counterparts in the arrangement illustrated in FIGURE 8.

Figure 9:
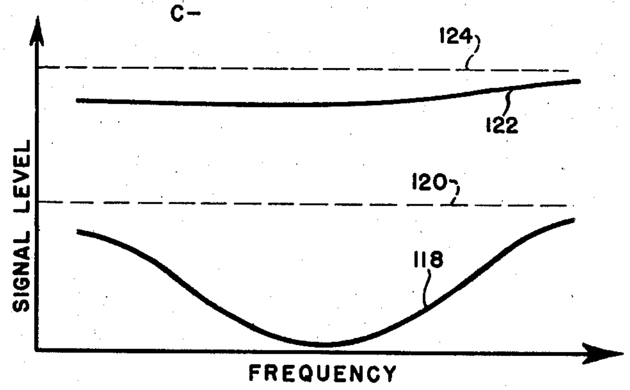
FIGURE 9 is a diagram illustrating the performance of the embodiment of the invention represented by FIGURE 8.

When a signal supplied to the tone control arrangement illustrated in FIGURE 8 is of low volume, a low negative bias is applied to the grid 112 of the triode 114, and current flow in the anode circuit of the triode is therefore large so that the neon light 110 shines brightly and the value of the variable resistor 106 is at a minimum. As a result thereof the voltage developed between point 115 of the variable filter 108 and ground is at a minimum and the volume of the output signal is at a minimum. However, with the ground resistor 106 at a minimum value, said resistor exerts a minimum of interference upon the frequency-selective response of the variable filter 108, and the characteristic of the output signal of this embodiment of the invention at low signal levels is therefore highly frequency-sensitive as demonstrated by the solid line curve 118 in FIGURE 9, and is substantially below the volume level of the input signal which is represented by the broken horizontal line 120 in said FIGURE 9. When the signal supplied to the embodiment of the invention illustrated in FIGURE 8, is of a high volume level, however, the light of neon lamp 110 is dimmed and the resistance of control resistor 106 is therefore high. As a result thereof, any voltage developed between point 115 and ground is relatively high. At the same time the high value of the ground resistor 106 has a padding effect upon the frequency-selective response of the filter 108. Hence, for signals of high volume, the output of the described network is relatively high and shows only a minor degree of frequency-sensitivity as is demonstrated by solid line 122 in FIGURE 9 which shows only the slightest degree of a curvature in comparison with the broken horizontal line 124 that represents an input signal of high volume.

The embodiment of the invention illustrated in FIGURE 8, therefore, constitutes a tone control arrangement that combines all the advantages of the control arrangement of FIGURE 2 as to performance but is of substantially simpler and less expensive construction.

It will be understood that a similar simplified tone control arrangement may be obtained by using a light-controlled photo-cell in place of the fixed resistor 116 of filter 108 and by substituting a fixed resistor for the photo-cell 106. Such an arrangement operates in substantially the same manner as the arrangement illustrated in FIGURE 8.

Figure 10:
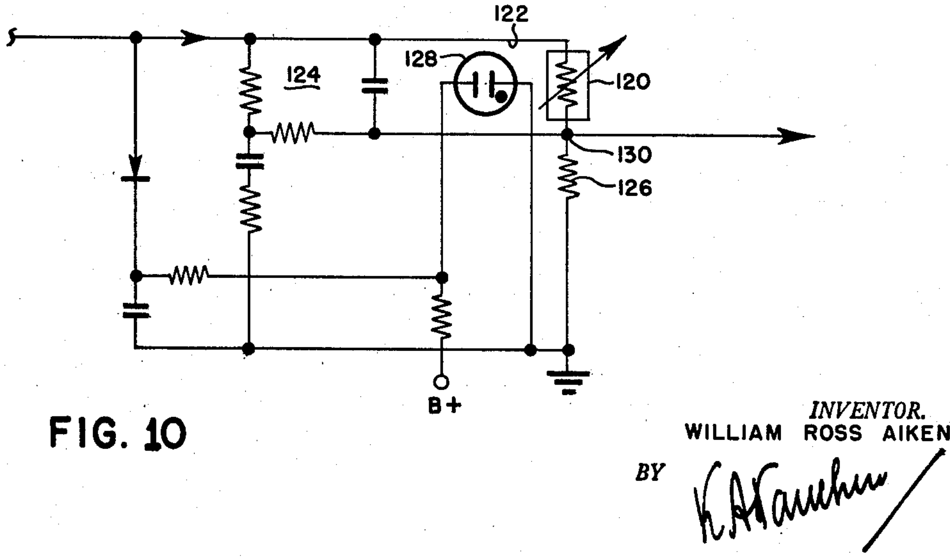
FIGURE 10 is a circuit diagram illustrating yet another embodiment of the invention as represented by FIGURE 7.

FIGURE 10 illustrates another simplified embodiment of the invention of the type represented by the block diagram of FIGURE 7. In this embodiment of my invention the variable control resistor 120 lies in a shunt line 122 around the frequency-sensitive filter 124, and the output voltage of the network is developed across a resistor 126 that is connected in series between the control resistor 120 and ground. The control resistor 120 may again be formed by a solid state photo-cell and its value is controlled by a neon lamp 128. For the described arrangement to operate in the manner of the networks illustrated in FIGURES 2 and 8, however, it is necessary that the light of the neon lamp 128 change in direct relation to the strength of the incoming signal because to obtain a frequency-sensitive response at low volume levels the value of control resistor must be high at low volume levels so that the signal is forced to pass through filter 124. For this purpose the light of neon lamp 128 must be dim at low signal levels. On the other hand for the output characteristic of the arrangement illustrated in FIGURE 10 to be frequency-independent and relatively high as it should be at high volume levels of the incoming signal, the value of control resistor 120 must be at a minimum so that the signal will pass through the by-pass line 122 rather than the filter 124 and most of the voltage developed across resistors 120 and 126 to ground may be taken off at the output point 130. This is accomplished by illuminating the neon lamp 128 to its maximum degree when the volume level of the incoming signal is high.

It will be understood that the variable frequency-selective filters comprised in the networks illustrated in FIGURES 2, 8 and 10 may be usefully employed in arrangements other than the particular tone control arrangement described hereinbefore. In particular, they may serve as means for selectively varying the frequency response of a filter without regard to changes in the volume level of the signals supplied thereto.

While I have explained my invention with the aid of certain preferred embodiments thereof, it will be understood that the invention is not limited to the specific circuit diagrams shown and described which may be departed from without departing from the scope and spirit of my invention. Thus, the variable resistors in the attenuator 22 which forms part of the embodiment of the invention illustrated in FIGURE 2, may be controlled by a light that varies in direct relation with the volume level of the incoming signal in which event the tone control arrangement will work as a compressor when resistor 92 is made variable, and as an expandor when resistor 90 is variable. Also, other variable volume changers than the variable attenuator shown in FIGURE 2, may be used in combination with the filter 20, such as amplifiers operating at gain levels of more than unity.

I claim:

1. A tone control arrangement comprising signal input means, a first condenser and a first resistor in parallel with each other, a second condenser and a variable resistor in series with each other connected in series with said parallel-connected condenser and resistor between said signal input means and ground, means connected to said signal input means responsive to signals received thereover for adjusting said variable resistor to different values, said adjusting means being operative with said filter means to provide an increased signal level for higher and lower frequencies for input signals of lower volume and a substantially unchanged level for the intermediate frequencies, and signal output means at a point between said parallel-connected condenser and resistor and said series-connected condenser and resistor.

2. A tone control arrangement comprising signal input means, a first condenser and a first resistor in parallel with each other, a second condenser and a resistor in series with each other connected in series with said parallel-connected condenser and resistor between said signal input means and ground, means connected to said signal input means operative to provide different conductive levels in response to receipt of signals of different values over said input means, said means being connected with said filter means to provide an increased signal level for higher and lower frequencies for input signals of a lower volume, and substantially unchanged level for signals in the intermediate frequencies, and signal output means connected at a point between said parallel-connected condenser and resistor and said series connected condenser and resistor.

References Cited by the Examiner

UNITED STATES PATENTS

| | | | |
|---|---|---|---|
| 1,979,035 | 10/34 | Hammond | 333—18 |
| 2,009,229 | 7/35 | Hammond | 333—18 |
| 2,606,973 | 8/52 | Scott | 333—18 |
| 2,845,490 | 7/58 | Knight | 330—143 |
| 3,040,178 | 6/62 | Lyman et al. | 250—213 |

HERMAN KARL SAALBACH, *Primary Examiner.*

BENNETT G. MILLER, *Examiner.*